Patented Apr. 7, 1925.

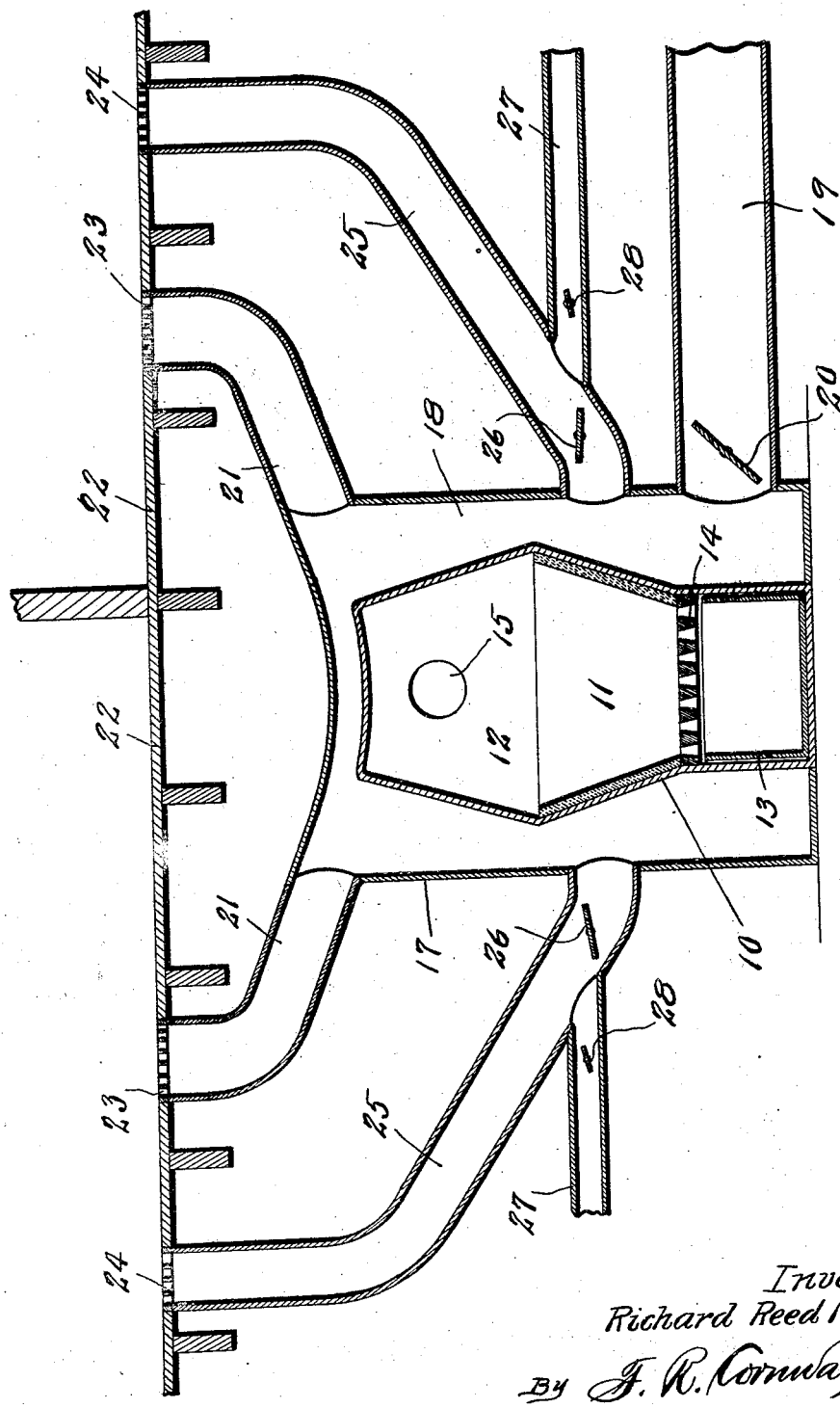

1,532,709

UNITED STATES PATENT OFFICE.

RICHARD REED MORRILL, OF PALO ALTO, CALIFORNIA.

HEATING AND VENTILATING SYSTEM.

Application filed August 21, 1922. Serial No. 583,264.

*To all whom it may concern:*

Be it known that I, RICHARD REED MORRILL, a citizen of the United States, residing at Palo Alto, county of Santa Clara, and State of California, have invented a certain new and useful Improvement in Heating and Ventilating Systems, of which the following is a full, clear, and exact description, such as will enable others skilled in the art to which it appertains to make and use the same, reference being had to the accompanying drawings, forming part of this application.

This invention relates to heating and ventilating systems for buildings, and the objects of the invention are to provide a simple and efficient heating system which is inexpensive to install and can be economically operated.

Further objects of the invention are to provide means whereby the air may be returned from the rooms of the building to the furnace to be heated and recirculated, and to provide a discharge conduit for each return pipe by means of which foul air may be conducted away from the system and discharged to the atmosphere, thus preventing the recirculation of the foul air through said heating system.

Still further objects of the invention are to provide means for controlling independently of each other the fresh air supply pipe, the return pipes and the foul air discharge pipes.

With these and other objects in view, my invention consists in certain novel features of construction and arrangements of parts hereinafter more fully described and claimed, and illustrated in the accompanying drawings, in which—

The figure represents a vertical cross section through the furnace and its connections and illustrating diagrammatically the operation of the system.

Referring by numerals to the accompanying drawing, 10 represents a furnace with a firepot 11, a combustion chamber 12, an ash pan 13 and a grate 14.

Leading from the combustion chamber is a flue pipe 15 by means of which the products of combustion are discharged from the combustion chamber. Enclosing the furnace 10 is an outer casing or shell 17 which is spaced from the furnace to form an air chamber 18.

Communicating with this chamber is a fresh air supply pipe 19 the outer end of which opens to the atmosphere, while its inner end is connected to the lower end of casing 17. The admission of fresh air from this pipe to chamber 18 is controlled by a closure plate 20 which is pivotally supported on the wall of said pipe and is adjustable to regulate the supply of cold air to chamber 18. The fresh air entering chamber 18 is heated by the furnace 10, rises to the upper end thereof, then passes into the hot air pipes 21 which are connected at their lower ends to the crown of the casing 17, and have their upper ends opening into the rooms to be heated, preferably through floors 22 of said rooms. Suitable registers 23 are provided in the floors to which said ends of pipes 21 may be connected.

Warm air issues from pipes 21, passes through registers 23, and circulates through the room, and is then forced or sucked away through registers 24 arranged in the floor of each room by means of return pipes 25, the upper ends of which are connected to said registers and the lower ends of which communicate with chamber 18 at points suitably located relative to the inlet opening of pipe 19 and the outlet openings of pipes 21.

Each pipe 25 is provided in its lower end, immediately above its conjunction with casing 17, with a closure plate 26, which is adjustable so as to regulate the incoming of the return air to the air chamber 18, which closure plate 26 may be closed so as to completely shut off communication between return pipe 25 and chamber 18.

Leading from each return pipe 25 at a point immediately above closure plate 26 is a foul air discharge pipe 27 the outer end of which opens to the atmosphere. A damper plate 28 is adjustably arranged in each pipe 27 and controls the passage of air through said pipe. Foul air discharge pipes 27 are of smaller cross-section than pipes 25, and their points of connection with such pipes are preferably located in the lowermost portions of pipes 25.

In the operation of the heating system, fresh air is admitted to chamber 18 by the supply pipe 19. The air upon being heated by furnace 10 ascends into the upper end of casing 17 and is conducted therefrom by pipes 21 to the various rooms. The warm air circulates through the rooms and is then drawn or forced through pipes 25 which return the air to chamber 18 to be heated again and recirculated through the rooms. The foul air is conducted away from pipes 25 by means of pipes 27 which discharge it to the atmosphere.

The inlet of fresh air to pipe 19 is regulated by closure or damper plate 20, while closure plates 26 and 28 can be adjusted so as to obtain the best results in recirculation of the return air from the building and the separation of the foul air from the heating system.

A heating and ventilating system of my improved construction is efficient in operation and inexpensive to install and operate, provides a supply of fresh air which can be readily heated to the desired temperature, and properly circulated through the building.

What I claim is:

1. In a heating system, the combination of a furnace having a combustion chamber and a hot air chamber, a fresh air conduit communicating with said hot air chamber at a point below said combustion chamber, hot air pipes leading from the upper end of said hot air chamber, hot air return pipes communicating with said hot air chamber at points above the source of heat in said combustion chamber, foul air discharge pipes connected to said return pipes and opening to the atmosphere, and dampers in said return pipes and said foul air discharge pipes for regulating the passage of air therethrough.

2. In a heating system, the combination of a furnace having a combustion chamber and a hot air chamber, a fresh air conduit communicating with said hot air chamber below said combustion chamber, hot air pipes leading from the upper end of said hot air chamber, hot air return pipes communicating with said hot air chamber at points above the source of heat in said combustion chamber and above the inlet connection of said fresh air conduit, foul air discharge pipes connected to said return pipes and opening to the atmosphere, and dampers in said return pipes and said foul air discharge pipes for regulating the passage of air therethrough.

3. In a heating and ventilating system, the combination of a furnace, a hot air chamber surrounding said furnace, hot air pipes leading from the upper end of said chamber for conducting the hot air to the rooms of a building, downwardly inclined return pipes leading from the lowermost portion of said rooms to the lower portion of said chamber for returning the air thereto at points above the source of heat of said furnace, discharge pipes of smaller diameter than said return pipes and communicating with said return pipes at points located in the low portions thereof, and opening to the atmosphere, and means in said foul air discharge pipes for controlling the communication therethrough.

4. In a heating and ventilating system, the combination of a furnace, a hot air chamber surrounding said furnace, a fresh air supply pipe connected to said chamber at a point below the source of heat of said furnace, hot air pipes leading from the upper end of said chamber for conveying hot air to the rooms of a building, downwardly inclined return pipes leading from the lower portions of said rooms to the low portion of said chamber for the return air from said rooms to said hot air chamber at a point above the source of heat, means in said return pipes for controlling the passage therethrough, branch pipes connected to the low portions of said return pipes adjacent to said controlling means for discharging the foul air from said return pipes to the atmosphere, and adjustable closure means in said foul air pipes.

5. In a heating and ventilating system, the combination of a furnace, a hot air chamber surrounding said furnace, a fresh air supply pipe connected to said chamber, hot air pipes leading from the upper end of said chamber for conveying hot air to the building, downwardly inclined return pipes leading from the low portion of said building to the low portion of said chamber for returning the air thereto, a foul air discharge pipe connected to the low portion of each return pipe and opening to the atmosphere, an adjustable closure member in each discharge pipe for controlling the passage therethrough, and adjustable closure means arranged in each return pipe between said chamber and said discharge pipe.

In testimony whereof I hereunto affix my signature this 6th day of July, 1922.

RICHARD REED MORRILL.